United States Patent [19]

Fujimoto et al.

[11] Patent Number: 4,827,519
[45] Date of Patent: May 2, 1989

[54] VOICE RECOGNITION SYSTEM USING VOICE POWER PATTERNS

[75] Inventors: Junichiroh Fujimoto; Tetsuya Muroi, both of Yokohama, Japan

[73] Assignee: Ricoh Company, Ltd., Tokyo, Japan

[21] Appl. No.: 908,681

[22] Filed: Sep. 17, 1986

[30] Foreign Application Priority Data

Sep. 19, 1985 [JP] Japan .................................. 60-207131
Jan. 29, 1986 [JP] Japan .................................. 61-17494

[51] Int. Cl.$^4$ ................................................ G10L 5/06
[52] U.S. Cl. ...................................... 381/42; 381/43
[58] Field of Search ..................... 381/41, 42, 43, 45

[56] References Cited

U.S. PATENT DOCUMENTS

| | | | |
|---|---|---|---|
| 4,084,245 | 4/1978 | Burge | 381/42 X |
| 4,618,983 | 10/1986 | Nishioka et al. | 381/43 |
| 4,624,010 | 11/1986 | Takebayashi | 381/43 |
| 4,624,011 | 11/1986 | Watanabe et al. | 381/43 |
| 4,625,287 | 11/1986 | Matsuura et al. | 381/43 X |

Primary Examiner—Bernard Roskoski
Assistant Examiner—Marc S. Hoff
Attorney, Agent, or Firm—Mason, Fenwick & Lawrence

[57] ABSTRACT

A voice processing method and system using voice power is provided. A voice power signal is produced in analog format and this voice power signal is sampled at a predetermined time interval to determine its current envelope or amplitude, which is then compared with a predetermined number of voice power levels, whereby "1" is assigned to at least one of the predetermined number of voice power levels which corresponds in level to the amplitude thus determined and "0" is assigned to the rest of the predetermined number of voice power levels, thereby converting the analog voice power signal into a binary voice power pattern. In the preferred embodiment, the voice signal is also processed through a frequency analyzer including a plurality of band-pass filters different in frequency range and a binary converter to form a binary time-frequency voice distribution pattern which is then combined with the binary voice power pattern to form a combined voice pattern. As a modification, a voice power range is determined by multiplying a predetermined threshold to the amplitude, and the voice power pattern is compared with the predetermined number of voice power levels.

11 Claims, 6 Drawing Sheets

FIG. 1
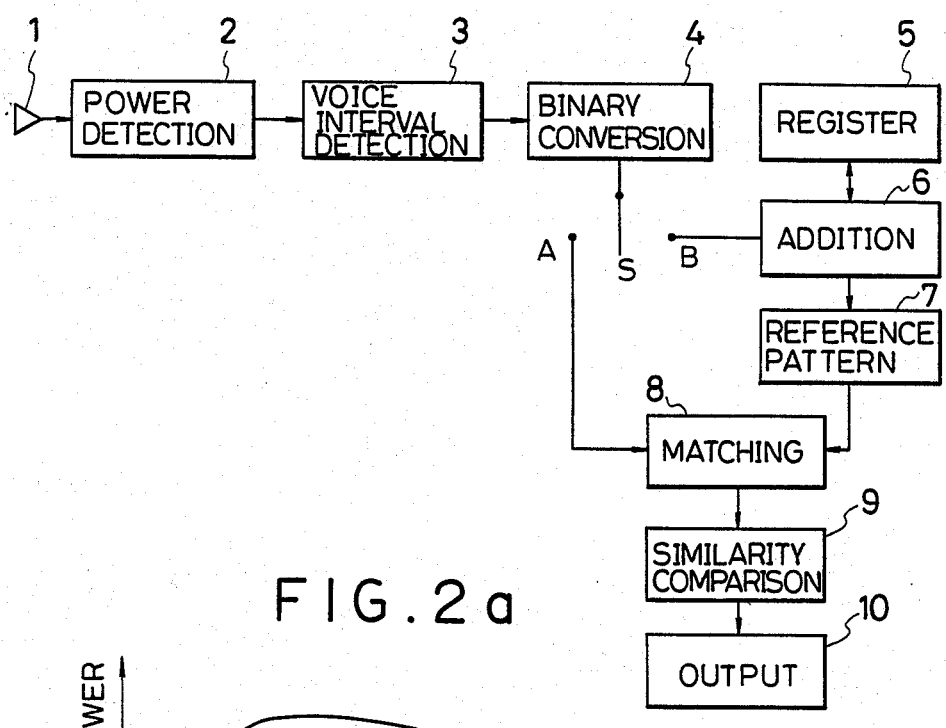
FIG. 2a
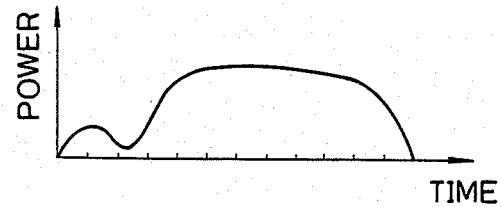
FIG. 2b  FIG. 2c  FIG. 2d
| 0 0 0 0 0 1 1 1 1 1 1 0 0 |
| 0 0 0 0 0 1 0 0 0 0 0 1 0 |
| 0 0 0 0 0 0 0 0 0 0 0 0 0 |
| 0 1 0 1 0 0 0 0 0 0 0 0 1 |
| 1 0 1 0 0 0 0 0 0 0 0 0 0 |
| 0 0 --- 0 0 |
| 0 0 --- 0 0 |
| 0 0 --- 1 0 |
| 0 1 --- 0 1 |
| 1 0 --- 0 0 |
| 0 0 --- 0 |
| 0 0 --- 0 |
| 0 1 --- 0 |
| 0 0 --- 0 |
| 1 0 --- 1 |
FIG. 2e
| 0 0 0 0 0 3 3 3 3 3 0 0 |
| 0 0 0 0 2 0 0 0 0 0 2 0 |
| 0 1 0 0 1 0 0 0 0 0 1 0 |
| 0 2 0 3 0 0 0 0 0 0 0 2 |
| 3 0 3 0 0 0 0 0 0 0 0 1 |

```
0 0 0 0 0 0 1 1 0 1 0 0 0 0
0 0 0 0 0 0 1 0 0 0 1 0 0 0
0 0 0 0 0 0 1 1 0 0 0 1 0 0
0 0 1 0 1 1 0 0 0 0 1 0 0 0
0 0 1 1 1 1 0 0 0 0 0 1 0 0
0 0 1 1 1 0 0 0 0 0 0 0 0 1
0 0 1 0 1 0 0 0 0 0 0 0 0 1
0 0 1 1 1 0 0 0 0 0 0 0 0 1
0 0 1 1 1 0 0 0 0 0 0 0 0 1
0 0 1 1 0 0 0 0 0 0 0 0 1 0
```
⎵_____⎵ ⎵\_\_\_\_\_⎵
VOICE SPECTRUM   VOICE POWER
F                G

VOICE RECOGNITION SYSTEM USING VOICE POWER PATTERNS

BACKGROUND OF THE INVENTION

1. Field of the Invention

This invention relates to voice or sound recognition technology, and, in particular, to a voice recognition system and method for recognizing an unknown voice using a voice power pattern.

2. Description of the Prior Art

Voice recognition technology has drawn much attention recently for applications to various office machines and the like. It has been developed to the extent that it can now recognize not only spoken words, but also monosyllabic voices or sounds. There has been proposed a voice recognition system using binary processing for ease of voice recognition. In accordance with this prior art method, a voice input is processed through a plurality of band-pass filters different in frequency range to obtain a time-frequency distribution pattern which is then compared with each of the previously stored patterns, whereby the degree of similarity between the input pattern and each of the stored patterns is determined. As a result, the one of the stored patterns which has the highest degree of similarity is chosen to identify the unknown voice thus input. In this system, the time-frequency distribution pattern can be represented by the binary numbers, and, thus, the processing of such binary-valued patterns can be carried out at high speed and with high reliability.

However, in accordance with the above-described prior art system, information relating to the intensity level or magnitude of voice is lost, so that it can recognize sounds abundant in information, such as words and speeches, with high reliability; however, it has difficulty in recognizing relatively short voices and sounds, such as monosyllabic sounds. For example, the prior art methods often encounter difficulty in recognizing the differences between such sounds as "P" and "K." Thus, there has been a need to develop a new technology which can recognize even relatively short voices or sounds which are rather scarce in sound information at high accuracy.

SUMMARY OF THE INVENTION

In accordance with the present invention, a voice power vs time distribution pattern is developed from a voice, and this voice power distribution pattern as a function of time is used for voice recognition. In the preferred embodiment, the voice power or energy is previously divided into a plurality of levels, and as the voice is sampled and its power level is determined at a predetermined time interval, one of the levels which corresponds to the current power level of the voice is determined and indicated by binary number "1" with the rest of the levels indicated by "0s." In this manner, the power level or an envelope of the power level may be determined in a two-dimensional coordinate system having a time frame in its abscissa and power levels in its ordinate. Such a time-voice power distribution pattern can be used in combination with a time-frequency distribution pattern for the same voice, in which case the rate of recognition of voices can be increased significantly. On the other hand, two or more power levels can be selected in association with a particular power level determined by comparison with a predetermined plurality of power levels. This will further enhance the rate of voice recognition.

It is therefore a primary object of the present invention to obviate the disadvantages of the prior art as described above and to provide an improved voice recognition system and method.

Another object of the present invention is to provide an improved voice recognition system using voice power as a base of voice recognition.

A further object of the present invention is to provide an improved voice recognition system high in the rate of recognition and fast and reliable in operation.

A still further object of the present invention is to provide a voice recognition system capable of recognizing even relatively short sounds and voices, such as monosyllabic sounds and voices, at high accuracy Other objects, advantages and novel features of the present invention will become apparent from the following detailed description of the invention when considered in conjunction with the accompanying drawings

BRIEF DESCRIPTION OF THE DRAWINGS

FIG. 1 is a block diagram showing a voice recognition system using voice power patterns constructed in accordance with one embodiment of the present invention;

FIGS. 2a through 2e are schematic illustrations showing a process of forming a voice power pattern which is useful for understanding the operation of the system shown in FIG. 1;

DESCRIPTION OF THE PREFERRED EMBODIMENTS

Figures 3, 4:
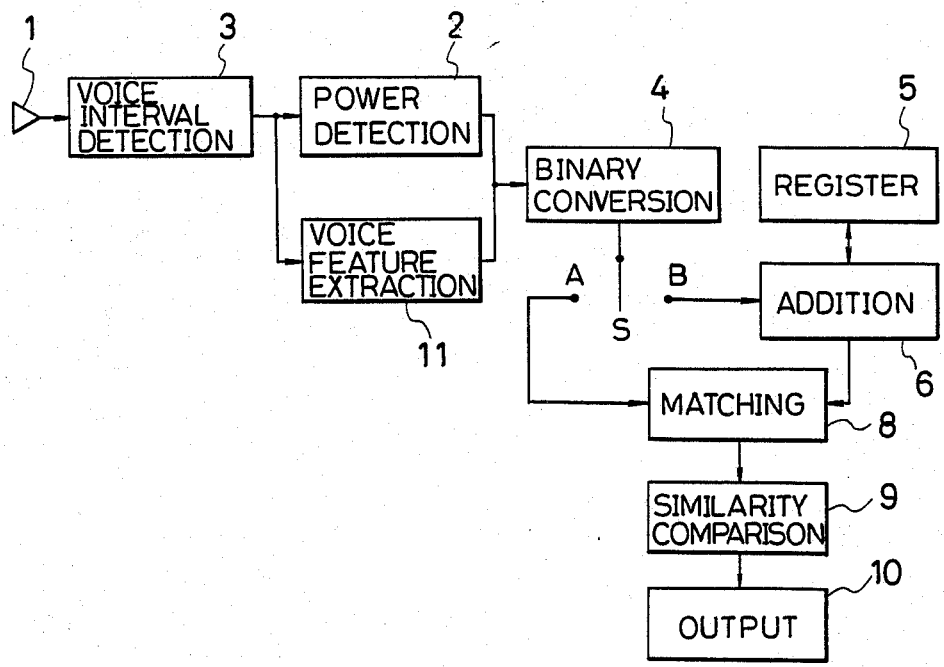
FIG. 3 is a block diagram showing a voice recognition system as modified from the system shown in FIG. 1 in accordance with another embodiment of the present invention.
FIG. 4 is a schematic illustration useful for understanding the operation of the system shown in FIG. 3.

Referring now to FIG. 1, there is schematically shown in block form a voice recognition system constructed in accordance with one embodiment of the present invention. As shown, the present system includes a microphone 1 for converting a voice or sound in the form of pressure waves into an electrical voice or sound signal and a power detector 2 for detecting the power of the voice. The power detection of an electrical voice signal can be carried out, for example, by detecting the envelope or amplitude of the electrical voice signal. The voice power signal is then supplied to a voice interval detector 3 where the power signal having a power level equal to or larger than a predetermined power level is determined and such a power signal whose voice interval has been determined is shown in FIG. 2a. The system also includes a binary converter 4 where the power signal from the voice interval detector 3 is sampled at a predetermined time interval and the sampled data is then converted into binary data, thereby forming a binary time-dependent voice power pattern as shown in FIG. 2b. In the case of the illustrated embodiment, the power level is previously divided into five levels, and, thus, when the voice power signal as shown in FIG. 2a is supplied to the binary converter 4, it is sampled at a predetermined time interval and the amplitude of the sampled data is then determined as to which of the five levels the sampled data belongs to. If the sampled data is found to belong to the lowest power level, as in the first sample in FIGS. 2a and 2b, the lowest level will be assigned "1" with the other levels being assigned all "0s." Thus, there are produced five binary data for each time interval in the present example, and such a group of five binary data will be referred to as "frame."

The binary converter 4 is connectable to either an adder 6 or matching (superposing) unit 8 through a selection switch S. A plurality of binary voice power patterns repetitively produced for the same voice are added at the adder 6 to define a consolidated voice power pattern which is then stored in a register 5. Thus, the register 5 stores a library of preselected voice power patterns. Also provided in the system is a reference pattern memory 7 which temporarily stores a voice power pattern as transferred from the register as a reference pattern to be compared with an unknown voice power pattern supplied from the binary converter 4 at a matching unit 8 by a superposition technique. The degree of similarity is calculated and stored in a similarity comparator 9, which determines which of the stored voice power patterns has the highest degree of similarity and outputs this data to an output unit 10.

Now, the operation of the voice recognition system shown in FIG. 1 will be described in detail with reference to FIGS. 2a through 2e. The illustrated system has two modes of operation: (1) voice registration mode and (2) voice recognition mode. When the system is to be operated in the voice registration mode, the mode selection switch S is turned to establish a connection with a contact B. Under the condition, when a voice in the form of pressure waves is input into the microphone 1, it is concerted into an electrical voice signal which is then supplied to the voice power detector 2, so that there is obtained a voice power signal at the output of the voice power detector 2. The voice power signal is then supplied to the voice interval detector 3 where the voice interval of the voice power signal thus supplied is determined as that portion of the voice power signal which has its voice power level higher than or equal to a predetermined voice power level. Such a processed voice power signal is schematically shown in FIG. 2a whose abscissa is taken for time and its ordinate is taken for voice power. Since its voice interval has been determined, the voice power signal shown in FIG. 2a continues for a time period corresponding to such voice interval.

Then, the voice signal thus processed at the voice interval detector 3 is supplied to the binary converter 4 where the voice power signal in analog format is converted into a digital voice power data as shown in FIG. 2b. In the present example, as the voice power signal shown in FIG. 2a is supplied to the binary converter 4, its envelope or amplitude is sampled at a predetermined time interval and then it is determined as to which of the five predetermined voice power levels does the sampled envelope belong to. As a result, one of the five predetermined voice power levels, to which the sampled envelope belongs, is assigned the binary number "1" with the rest all assigned "0s." For example, in the case of FIG. 2b, for the first frame or first time interval, since the envelope of the voice power signal shown in FIG. 2a corresponds to the lowest voice power level, "1" is assigned to the lowest bit with "0s" assigned to the other bits. For the second frame, on the other hand, since the envelope of the voice power signal shown in FIG. 2a corresponds to the second lowest voice power level, "1" is assigned to the second lowest bit while "0s" are assigned to the other bits. As a result, each frame in the digital pattern data shown in FIG. 2b has five bits of binary data and the location of "1" corresponds to the envelope or amplitude of the voice power signal shown in FIG. 2a. In this manner, the analog voice power signal shown in FIG. 2a is converted into binary voice power pattern shown in FIG. 2b by the binary converter 4.

The binary voice power pattern thus created is then supplied to the adder 6 through the switch S and then stored into the register 5. Since this is the first time for storing the binary voice power pattern for a particular voice input into the microphone, no previous binary voice power pattern is stored in the register 5, and, thus, no addition takes place at the adder 6. In the preferred embodiment, the same voice is pronounced by the same or different person for the second time and input into the microphone The voice thus input is processed in a manner described above to produce another binary voice power pattern at the binary converter 4 as shown in FIG. 2c and this newly produced binary voice power pattern is added to the previously produced binary voice pattern now stored in the register 5. Similarly, a third binary voice power pattern is produced as shown in FIG. 2d and it is also added to the superposed binary voice power pattern now stored in the register 5. The resulting consolidated voice power pattern obtained by adding the three binary voice power patterns is shown in FIG. 2e and stored as one of reference voice patterns in the reference pattern unit 7, which contains a library of reference binary voice power patterns. Since there are slight differences in the form of the voice power signal each time when it is created, there are shown some scatter of data in the consolidated binary voice power pattern. The above-described process is repeated for desired number of voices or sounds and they are finally stored in the reference pattern unit 7.

Next, the mode selection switch S is turned to establish connection with a contact A, so that the present system is set in the voice recognition mode. In this case, when an unknown sound or voice is input into the microphone 1, it is processed in a manner similar to that described above, so that a binary voice power pattern is produced at the binary converter 4. The binary voice power pattern of the unknown voice is then supplied to the matching unit through the switch S, where the binary voice power pattern of the unknown voice is compared with each of the reference binary voice power patterns stored in the reference pattern unit 7, thereby calculating the degree of similarity. In this case, the degree of similarity may be defined as a sum of products of the two corresponding bits between the binary voice power pattern of the unknown sound and one of the reference binary voice power patterns. The degree of similarity is calculated for each of the reference patterns and one of them which has the highest degree of similarity is selected and supplied as an output.

FIG. 3 shows a voice recognition system constructed as modified from the structure shown in FIG. 1. It is to be noted that, as practiced throughout the specification and the drawings, like elements are indicated by like numerals unless otherwise noted. The present system shown in block form in FIG. 3 is similar in many respects to the system shown in FIG. 1 excepting that the voice power detector 2 and the voice interval detector 3 are switched in position and a voice feature extractor 11 is additionally provided as connected between the voice interval detector 3 and the binary converter 4. The voice feature extractor 11 is designed to extract a predetermined feature of voice other than voice power and the voice feature extracted is combined with the voice power in a side-by-side relation to define a combined voice pattern. In the preferred embodiment, the voice feature to be extracted is a time-dependent frequency pattern as well known in the art, though the present system is not limited only thereto. In this case the voice feature extractor 11 includes a plurality (9 in the present case) of band-pass filters different in frequency range, so that when the voice signal is processed through the voice feature extractor 11, there is formed a collection of filtered voice signals different in frequency.

In operation, when a voice is input into the microphone 1, it is converted into an electrical voice signal which is supplied to the voice interval detector 3 where the voice interval of the electrical voice signal is determined as compared with a predetermined threshold level. The electrical voice signal is then supplied to both of the voice power detector 2 and the voice feature extractor 11, so that a voice power signal is produced from the voice power detector 2 and a collection of filtered voice signals. These voice power signals and filtered voice signals are both supplied to the binary converter 4, where these signals are sampled at a predetermined time interval and converted into binary data. In the illustrated embodiment, the envelope of the voice power signal supplied from the voice power detector 2 is examined as to which of the predetermined five voice power levels it belongs to and "1" is assigned to one of the five voice power levels with "0" assigned to each of the remaining four voice power levels, thereby defining a voice power segment of a frame as indicated by G in FIG. 4. At the same time, the filtered voice signals are subjected to binary conversion, thereby producing a voice spectrum data including 9 binary bits, which defines a voice spectrum segment F of a frame as also shown in FIG. 4. Accordingly, in the present embodiment, each frame has 14 binary bits, among which the left 9 bits define a voice spectrum segment F of the frame and the right 5 bits define a voice power segment G of the frame. In this manner, the voice power signal and filtered signals are processed in sequence and a combined binary voice pattern having the voice spectrum data F and the voice power data G in a side-by-side relation is formed.

In the present case, the rate of voice recognition is significantly enhanced because comparison between two voice patterns is effected using two voice features. It should also be noted that the two different voice features can be handled in the same manner since both of them are converted into the binary data entirely It should also be noted that the degree of similarity may be calculated for each of the voice spectrum section and the voice power section separately. In this case, the partial degree of similarity for one of the voice spectrum and voice power sections may be used as a main data while using the other as an auxiliary data.

Figure 5:
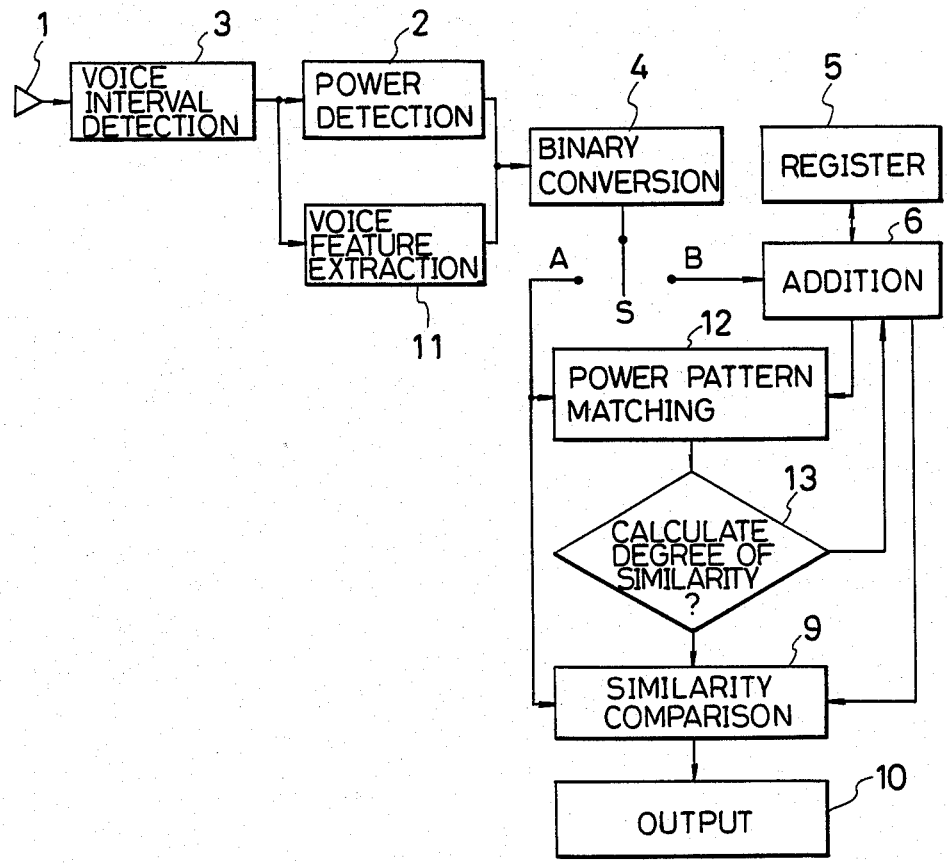
FIG. 5 is a block diagram showing a voice recognition system as modified from the system shown in FIG. 3 in accordance with a further embodiment of the present invention.

FIG. 5 shows in block form a voice recognition system constructed as modified from the structure shown in FIG. 3. As shown in FIG. 5, the present system is similar to the previous system of FIG. 3 in many respects, and, thus, like elements are indicated by line numerals. In the present system, however, provision is made of a power pattern matching unit 12 which is connected to receive a combined binary voice pattern from the binary converter 4 and also from the reference pattern unit 6. Thus, even if the combined binary voice pattern including a voice time-frequency distribution pattern and a voice power pattern as shown in FIG. 4 is supplied, only the voice power pattern segments of the input pattern from the binary converter 4 and the reference pattern unit 6 are compared to calculate the partial degree of similarity at the power pattern matching unit 12. The result of the comparison is supplied to a judgement unit 12 where it is decided as to whether the degree of similarity for the remaining segments of the two patterns is to be calculated at the similarity calculation unit 9.

Alternatively, it may also be so structured that the unit 12 calculates the degree of similarity only between the time-frequency spectral distribution pattern segments of the input and reference patterns and the degree of similarity of the power pattern segments is calculated only when the degree of similarity between the time-frequency spectral distribution pattern has been found to satisfy a predetermined condition. Furthermore, the present system shown in FIG. 5 may also be so modified that a preliminary degree of similarity is calculated for a predetermined number of frames (one or more) and the total degree of similarity between input and reference patterns is calculated only when the preliminary degree of similarity has been found to satisfy a predetermined condition.

Figure 10:
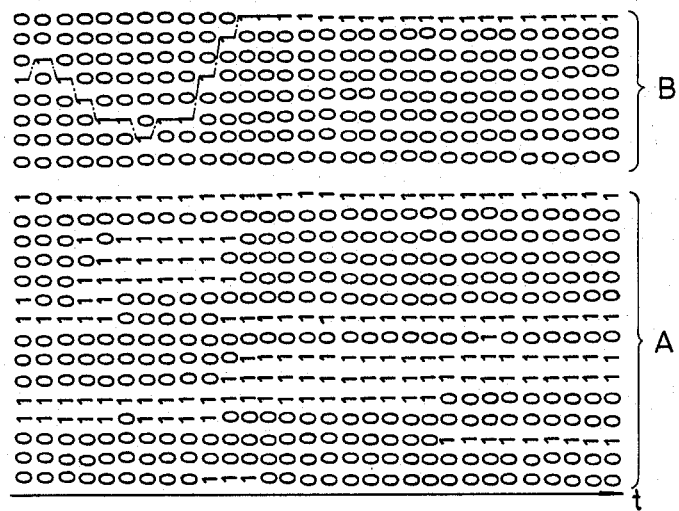
FIGS. 10 and 11 are schematic illustrations which are useful for understanding the advantages of the system shown in FIG. 6.
Figure 11:
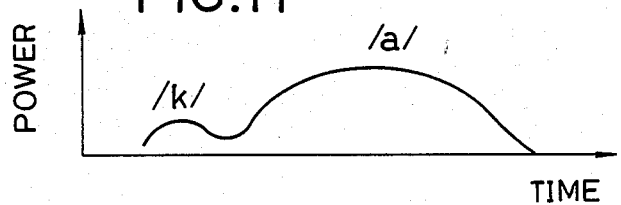

FIGS. 10 and 11 show a specific example when a monosyllabic sound "ka" is processed through the system shown in either FIG. 3 or FIG. 4. The time-dependent voice power distribution for "ka" is shown in FIG. 11 whose abscissa is taken for time and ordinate is taken for voice power level. FIG. 10 shows a combined binary voice distribution pattern obtained at the output of the binary converter 4 shown in FIGS. 3 and 5, and the combined pattern includes a time-frequency distribution pattern segment A and a voice power distribution pattern segment B. It should be understood that, in the present example, use is made of 15 band-pass filters for frequency analysis and the voice power level is divided into 8 levels. The voice signal is sampled at a time interval of 10 milliseconds and it is subjected to frequency analysis and at the same time voice power level analysis, so that each frame includes 15-bit data for the time-frequency pattern segment A and 8-bit data for the voice power pattern segment B. Such a frame is created in a timed sequence and arranged in a sequential order to define the combined voice pattern shown in FIG. 10. As indicated by the one-dotted line in the voice power pattern segment B, the location of "1" in each of the frames corresponds to the amplitude of the voice power signal shown in FIG. 11. As described previously, it should be noted that in either of the systems shown in FIGS. 3 and 5, the voice power segment B of each of the frames includes only one binary data "1."

Figure 6:
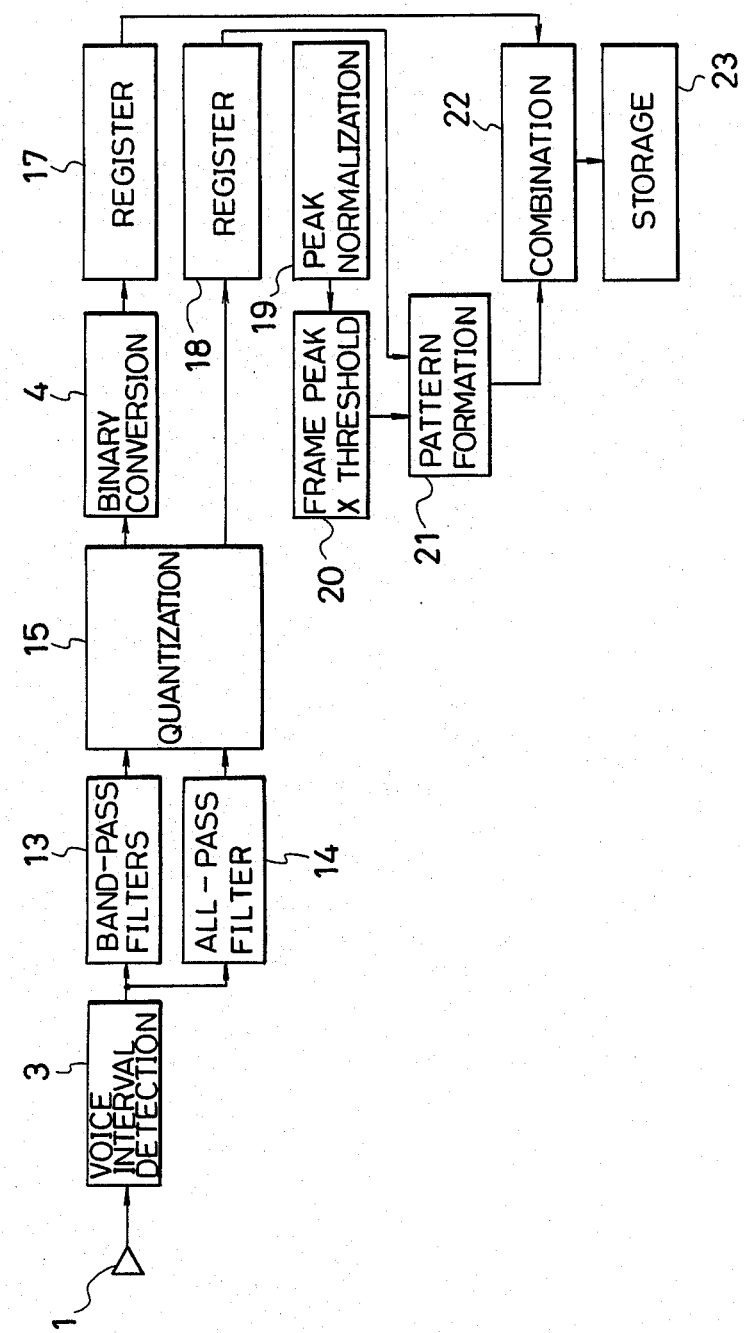
FIG. 6 is a block diagram showing a voice recognition system constructed in accordance with a still further embodiment of the present invention.
Figure 7:
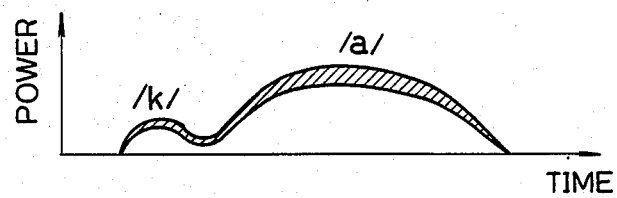
FIG. 7 is a schematic illustration which is useful for understanding the principle of operation of the system shown in FIG. 6.

FIG. 6 shows a voice pattern forming system suitable for use in a voice pattern recognition system constructed in accordance with a further embodiment of the present invention. That is, the voice pattern forming system shown in FIG. 6 is so designed to form a combined binary voice pattern including a voice power pattern segment and a voice time-frequency distribution pattern segment. In the present embodiment, however, the voice power pattern segment of each of the frames of a combined binary voice pattern is so formed to include two or more binary data "1", i.e., a top voice power range being calculated by multiplying a predetermined ratio to the amplitude of the voice power signal and those of the predetermined voice power levels which correspond to the thus calculated top voice power range are assigned "1" with the rest being assigned "0."

Figure 8:
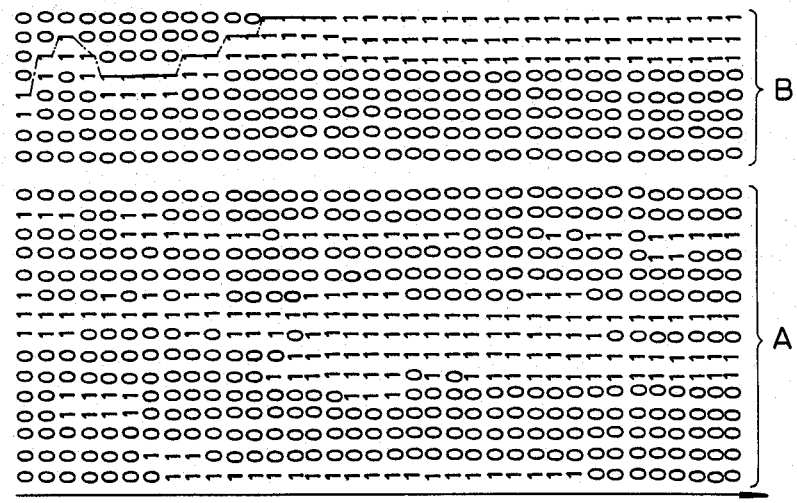
FIG. 8 is a schematic illustration showing a combined time-dependent frequency and voice power pattern which is also useful for understanding the operation of the system shown in FIG. 6.

The voice pattern forming system shown in FIG. 6 includes a microphone 1 for converting a voice in the form of pressure waves into an electrical voice signal and a voice interval detector 3 which determines the voice interval of the electrical voice signal by comparing the electrical voice signal with a predetermined threshold voice level. The voice interval detector 3 is connected to a frequency analyzer 13 comprised of a plurality (15 in the present example) of band-pass filters different in frequency range and also to an all-pass filter 14. A quantization unit 15 is provided to receive filtered signals from the band-pass filters 13 and also from the all-pass filter 14 and thus the filtered voice signals are subjected to quantization at a time interval of 10 milliseconds. The signal from the band-pass filters 13, after quantization, is supplied to a binary converter 4, where a binary time-frequency distribution pattern as shown by the segment A in FIG. 8 is formed, which is then stored in a register 17 as one voice. At the same time, the voice signal processed through the all-pass filter 14, after quantization at 15, is stored into another register 18 as one voice. The peak value of the data stored in the register 18 is detected and the data in the register 18 is normalized such that the peak data corresponds to the highest (8th in the present example) of a predetermined number of voice power levels at a peak/normalization unit 19. After normalization, a local peak in each frame is detected and a predetermined threshold, e.g., 20% from the peak, is multiplied to the local peak at a unit 20 to determine the top range of each frame, as indicated by the shaded area in FIG. 2. And, those of the eight power levels which fall onto the thus calculated top range of each frame are assigned "1" with the rest assigned "0" at a pattern formation unit 21. The resulting voice power pattern is shown in the segment B in FIG. 8. That is, in accordance with the present pattern forming system, the voice power pattern segment of each frame includes two or more binary "1s" and thus the rate of recognition can be enhanced. The voice power pattern thus formed at 21 is then combined with the voice time-frequency pattern stored in the register 17 at a combination unit 22 to define a combined voice pattern shown in FIG. 8, which is then stored in a storage unit 23.

Figure 9:
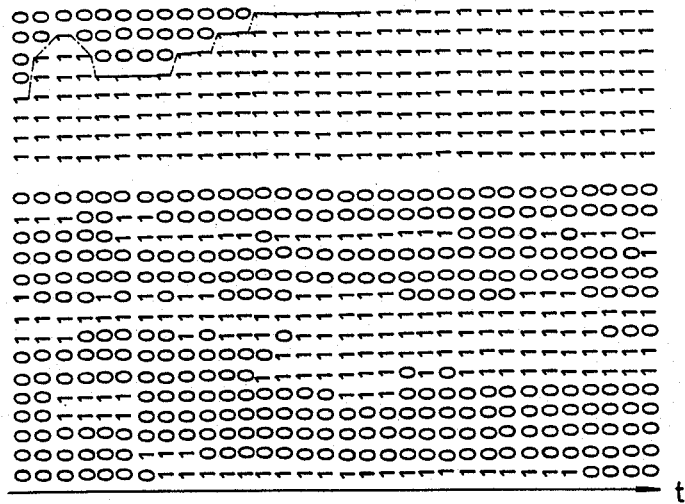
FIG. 9 is a schematic illustration showing another example of combined time-dependent frequency and voice power pattern which may also be advantageously used in the system of FIG. 6.

FIG. 9 shows a combined binary voice pattern in the case where the threshold is set at 100%, i.e., all of the predetermined voice power levels corresponding to the amplitude of the voice power signal being assigned "1."

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for forming a binary voice power pattern, comprising the steps of:
    converting a voice in the form of pressure waves into an electrical voice signal;
    processing said electrical voice signal to define an analog voice power signal whose voice power is equal to or above a predetermined voice power level;
    sampling said analog voice power signal at a predetermined time interval to determine a current amplitude thereof; and
    comparing the thus determined current amplitude with a predetermined number of voice power levels, thereby assigning a first binary data to at least one of the predetermined number of voice power levels which corresponding to said amplitude and assigning a second binary data, which is different from said first binary data, to the remaining of the predetermined number of voice power levels to form said binary voice power pattern.

2. The method of claim 1 further comprising, after the step of sampling, a step of determining a voice power range by multiplying a predetermined threshold to said amplitude, and wherein said step of comparing compares said voice power range with said predetermined number of voice power levels, thereby assigning said first binary data to at least one of the predetermined number of voice power levels which corresponds to said voice power range and said second binary data to the remaining of the predetermined number of voice power levels to form said binary voice power pattern.

3. A voice processing system comprising:
    a transducer for converting a voice in the form of pressure waves into an electrical voice signal;
    processing means for processing said electrical voice signal to define an analog voice power signal whose voice power is equal to or higher than a predetermined voice power level;
    sampling means for sampling said analog voice power signal at a predetermined time interval to determine an amplitude thereof;
    comparing means for comparing said amplitude with a predetermined number of voice power levels to assign a first binary data to at least one of said predetermined number of voice power levels which corresponds to said amplitude and a second binary data, which is different from said first binary data, to the remaining of said predetermined number of voice power levels, thereby converting said analog voice power signal into a binary voice power pattern; and storing means for storing said binary voice power pattern.

4. The system of claim 3 further comprising adding means for adding at least one other binary voice power pattern formed by said sampling means to said binary voice power pattern stored in said storing means in a superposed relationship.

5. The system of claim 3 further comprising comparing means for comparing said binary voice pattern formed by said sampling means with said binary voice power pattern stored in said storing means, and means for determining a degree of similarity between said two compared patterns.

6. A voice processing system comprising:
a transducer for converting a voice in the form of pressure waves into an electrical voice signal;
processing means for processing said electrical voice signal to define an analog voice signal whose voice power is equal to or higher than a predetermined voice power level;
first detecting means for detecting a voice power of said analog voice signal to form an analog voice power signal;
second detecting means for detecting a predetermined feature other than voice power of said analog voice signal to form at least one voice feature signal;
sampling means for sampling said analog voice power signal at a predetermined time interval to determine an amplitude thereof;
comparing means for comparing said amplitude with a predetermined number of voice power levels to assign a first binary data to at least one of said predetermined number of voice power levels which corresponds to said amplitude and a second binary data, which is different from said first binary data, to the remaining of said predetermined number of voice power levels, thereby converting said analog voice power signal into a binary voice power pattern, said sampling means also sampling said voice feature signal and converting said voice feature signal into a voice feature binary pattern in a predetermined manner, which is then combined with said binary voice power pattern to define a combined binary voice pattern; and
storing means for storing said combined binary voice power pattern.

7. The system of claim 6 wherein said second detecting means includes a predetermined number of bandpass filters different im frequency, so that said predetermined feature is a time-frequency distribution pattern of said voice.

8. The system of claim 7 further comprising adding means for adding at least one other combined binary voice pattern formed by said sampling means to said combined binary voice pattern stored in said storing means as superposed thereon.

9. The system of claim 8 further comprising comparing means for comparing said combined binary voice pattern formed by said sampling means with said combined binary voice pattern stored in said storing means and means for determining a degree of similarity between said two compared patterns.

10. The system of claim 9 wherein said comparing means includes partial comparing means for comparing said two pattern partially, preliminary calculating means for calculating a preliminary degree of similarity between said partially compared patterns and judging means for determining whether or not said two compared patterns are to be fully compared to calculate the degree of similarity between the two patterns based on said calculated preliminary degree of similarity.

11. A system of processing voice information comprising:
transducer means for converting a voice in the form of pressure waves into an electrical voice signal;
processing means for processing said electrical voice signal to define an analog voice power signal whose voice power is equal to or higher than a predetermined voice power level;
means for sampling said analog voice power signal at a predetermined time interval to determine an amplitude thereof;
means for determining a voice power range by multiplying a predetermined threshold to said amplitude;
means for comparing said voice power range with a predetermined number of voice power levels;
means for assigning a first binary data to at least one of said predetermined number of voice power levels which corresponds to said voice power range and a second binary data, which is different from said first binary data, to the remaining of said predetermined number of voice power levels, thereby converting said analog voice power signal into a binary voice power pattern; and
storing means for storing said binary voice power pattern.

* * * * *